United States Patent [19]

Todor, Jr. et al.

[11] Patent Number: 4,906,510
[45] Date of Patent: Mar. 6, 1990

[54] METHOD AND APPARATUS FOR FORMING A HINGE FOR LAMINATED CORRUGATED MATERIAL

[75] Inventors: John S. Todor, Jr., Arvada; Henry L. Zoetewey, Englewood, both of Colo.

[73] Assignee: Adolph Coors Company, Golden, Colo.

[21] Appl. No.: 221,781

[22] Filed: Jul. 20, 1988

[51] Int. Cl.⁴ .......................... B32B 3/30; B32B 3/28; B65D 19/00
[52] U.S. Cl. .................................. 428/182; 428/183; 428/186; 108/51.1; 108/51.3; 108/52.1; 108/901; 264/DIG. 4
[58] Field of Search .................... 108/51.1, 51.3, 52.1, 108/901; 264/DIG. 4; 428/182, 183, 186

[56] References Cited

U.S. PATENT DOCUMENTS

| | | | |
|---|---|---|---|
| 2,148,176 | 2/1939 | Schroeder | 428/186 X |
| 2,302,137 | 11/1942 | Neuman | 108/51.1 X |
| 2,432,295 | 12/1945 | Donahue | 108/52.1 |
| 2,885,073 | 5/1959 | Bettoli et al. | 428/186 X |
| 3,776,145 | 12/1973 | Anderson et al. | 108/51.1 |
| 3,850,116 | 11/1974 | Mackes | 414/787 |
| 4,042,127 | 8/1977 | Brossia | 206/386 |
| 4,467,004 | 8/1984 | Liebel | 108/51.3 X |
| 4,507,348 | 3/1985 | Nagata et al. | 428/172 |

FOREIGN PATENT DOCUMENTS

| | | | |
|---|---|---|---|
| 453229 | 12/1948 | Canada | 428/182 |
| 0122386 | 9/1979 | Japan | 428/182 |
| 650703 | 12/1947 | United Kingdom | 108/51.3 |

Primary Examiner—Ellis P. Robinson
Assistant Examiner—W. Watkins, III
Attorney, Agent, or Firm—Klaas & Law

[57] ABSTRACT

A corrugated plastic slip pallet is provided and comprises an intermediate corrugated member sandwiched between two generally planar sheet-like panel members and having a flat body portion on which boxes are supported and three lip portions hingedly connected to edges of the flat body portion and forming an included angle therewith of between about 135 and 160 degrees and wherein the hinge connection comprises two spaced apart welded portions extending parallel to an associated edge of the flat body portion and wherein the portions of the intermediate corrugated member and the two generally planar sheet-like panel members between the two spaced apart welded portions are not welded together. The flat body portion has a generally planar bottom surface and the hinge connection has a portion thereof located below the generally planar bottom surface so that when an unloaded plastic slip pallet is supported by a planar support surface, a major portion of the bottom surface is spaced from the support surface so that when the boxes are loaded onto the flat body portion, the major portion will be moved into contact with the support surface and move the lip portion to decrease the included angle between the lip portions and the flat body portion. Also provided is apparatus for forming a plurality of corrugated plastic board-like members into corrugated plastic slip pallets using an ultrasonic welding apparatus.

12 Claims, 10 Drawing Sheets

METHOD AND APPARATUS FOR FORMING A HINGE FOR LAMINATED CORRUGATED MATERIAL

FIELD OF THE INVENTION

This invention relates to method and apparatus for forming a hinge for laminated corrugated material and is particularly directed to apparatus and method for forming a lip portion on a corrugated plastic slip pallet.

BACKGROUND OF THE INVENTION

Plastic slip pallets, such as those described in U.S. Pat. Nos. 3,776,145; 3,850,116 and 4,042,127, have been used for ease of storage and handling of a load of boxes supported thereon in a warehouse, a manufacturing facility and during shipment by rail or by truck. A plastic slip pallet has a lip means adapted to be gripped by a lift truck and held in tension while slipping a platen, or spatula-like member, of the lift truck under the plastic slip pallet. The platen then lifts the plastic slip pallet and the boxes supported thereon and transports them to a desired location where the slip pallet and the boxes are pushed off the platen. A recent development in plastic slip pallets is disclosed in U.S. Pat. No. 4,507,348 to Nagata et al. The slip pallet in Nagata et al. comprises a support member comprising an interlining core sandwiched between and secured to two liners and has a flap portion continuous to the support member through a bending portion in which the interlining core and the two liners are compressed together and fused into one continuous layer to provide a hinge effect. In addition to the field of slip pallets described above, there are many other uses which require an integral hinge portion to be formed in a laminated corrugated member.

BRIEF DESCRIPTION OF THE INVENTION

This invention provides method and apparatus for forming a hinge in a piece of laminated corrugated material comprising a piece of corrugated material comprising an intermediate corrugated member having crests and valleys sandwiched between two generally planar sheet-like panel members and connected thereto at the crests and valleys and having at least one flat body portion connected to at least one other portion of the corrugated material by an integral hinge portion comprising an elongated groove having inclined side wall portions located on opposite sides of and being integrally connected to an intermediate connecting portion. Each of the side wall portions including a narrow width weld portion whereat the panel members and the intermediate corrugated member are fixedly permanently connected and located in abutting relationship on opposite sides of the intermediate connecting portion. The panel members and the intermediate corrugated member being spaced from and unconnected with one another except at the connections at the crests and valleys along the intermediate connecting portion. The thickness of the intermediate connecting portion being greater than the combined individual thicknesses of the two panel members and the thickness at each weld portion is equal to or less than the combined individual thicknesses of the two panel members and the intermediate corrugated member. The invention also provides apparatus and method wherein a pallet load of pieces of unformed corrugated material are positioned in the apparatus and moved through a plurality of operations wherein each piece of the corrugated material member is provided with the integral hinge portion described above and loaded onto a wooden pallet which is then moved into storage.

In the preferred embodiment of the invention, the piece of corrugated material is used as a corrugated plastic slip pallet comprising an intermediate corrugated member formed from a plastic material sandwiched between two generally planar sheet-like panel members each of which is formed from a plastic material and wherein the intermediate corrugated member has crests and valleys, with one of the two generally planar sheet-like panel members secured to the corrugated layer at said crests and the other of the two generally planar sheet-like panel members secured to the intermediate corrugated member at the valleys so that the two generally planar sheet-like panel members and the intermediate corrugated member are spaced apart from each other except at the crests and valleys. The corrugated plastic slip pallet has a flat body portion on which the boxes are supported and which is defined by opposite pairs of parallel edges. Lip means may be provided along one, two or three or all four of the edges.

In the presently preferred embodiment, there are three lip means wherein each of the lip means extends upwardly at an angle less than 180 degrees with the central area portion. One of the lip means extends in a direction generally perpendicular to the corrugations in the intermediate corrugated member, and two of the lip means extend in directions generally parallel to the corrugations in the intermediate corrugated member. Integral hinge means connect each of the lip means to the flat body portion. Each of the hinge means comprises at least two spaced apart welded portions welding together superposed and abutting portions of the two panel members and the intermediate corrugated member and the two spaced apart welded portions extend in directions parallel to an associated edge and to each other. The portions of the two generally planar sheet-like panel members and the intermediate corrugated member located between the two spaced apart welded portions form an intermediate connecting portion wherein they remain separated from each other except for the location therein of any crest or valley. The combination of the two spaced apart welded portions and the separation of the two generally planar sheet-like panel members and the intermediate corrugated member cooperate to hold the lip means in a position extending upwardly from the flat body portion so that the included angle between the upper surface of each of the lip means and the flat body portion is between about 135 and 160 degrees and preferably about 150 degrees.

The mechanism for producing the two spaced apart welded portions comprises a fixture comprising a base member support having a generally planar upper surface mounted at a fixed location and comprising four members in picture-frame relationship and having upper generally planar support surfaces lying in the same plane. Anvil means having three sections are mounted on three of the support surfaces of the base member means so that two of the sections extend at an angle of 90 degrees to the ends of one of the sections. Each section of the anvil means is formed as a plate-like member having a generally planar upper surface having a linearly extending generally V-shaped groove extending downwardly from the upper surface of the plate-like member with oppositely facing linearly extending side wall portions having an included angle of about 90 degrees. The lower ends of the side wall portions are joined by an arcuate surface having a predetermined radius. The side wall portions for the one section of the anvil means are each continuous and the side wall portions for each of the other two sections have oppositely facing, spaced apart, outwardly extending abutments. An unformed piece corrugated plastic material having a rectangularly shaped flat body portion and three integral lip means, all of which have upper surfaces lying in the same plane, is superposed over the three sections of the anvil means so that the corrugations in the unformed piece of corrugated material extend parallel to the V-shaped grooves in the two sections of the anvil means and extend perpendicular to the V-shaped groove in the one section of the anvil means.

The unformed piece of corrugated material is positioned in superposed relationship over the anvil means by an overhead vacuum conveyor means that has portions located between the two anvil means and terminates immediately before the one anvil means. The unformed piece of corrugated material is positioned on the vacuum conveyor means so that the flat body portion and the leading edge portion of the one lip means to be positioned over the one anvil means are in contact with the vacuum conveyor means. The vacuum conveyor means are moved toward the one anvil means until the one lip means moves away from its contact with the vacuum conveyor means and moves over the one anvil means. When the leading edge reaches a set location, it trips an electric signal to stop the movement of the vacuum conveyor means so that portions of the piece of corrugated material are in proper superposed relationship over the three sections of the anvil means.

An ultrasonic welding apparatus is movably mounted above the base member means and the three sections of the anvil means for movement toward or away from the base member means and the anvil means. The ultrasonic welding apparatus is provided with three sets of welding horns which are mounted in a generally U-shaped relationship and are located so that the tip portions thereof mate with the V-shaped grooves in the three sections of the anvil means. The outer surface of the tip portion of each of the welding horns is semi-circular in a transverse cross-sectional configuration which semicircle has a radius greater than the radius of the arcuate surface of the V-shaped grooves. The diameter of the outer surface of the tip portion is less than the distance between the ends of the side wall portions next adjacent to the upper surface of the anvil means so that the bottom portion can enter into the V-shaped grooves. After the unformed piece of corrugated material has been positioned over the three anvil means, the vacuum means in the vacuum conveyor means functions to hold the central area portion of the piece of unformed corrugated material in a relatively fixed location.

The ultrasonic welding apparatus is moved toward the three sections of the anvil means and the tip portions of the welding horns move into contact with portions of the upper surface of the unformed piece of corrugated material and push such portions into the V-shaped grooves of the three sections of the anvil means. Movement of the ultrasonic welding apparatus is continued until superposed portions of each of the two generally planar sheet-like panel members and the intermediate corrugated member are clamped between spaced apart portions of the tip portions of the welding horns and portions of each of said wall portions of the V-shaped grooves. The portions of the intermediate corrugated member and the two planar sheet-like panel members between the clamped together superposed areas remain in a separated condition. The ultrasonic apparatus is actuated so that the superposed portions of the two generally planar members and the corrugated layer are welded together to form an integral hinge as described above connecting the flat portion to the lip means by a pair of spaced apart welded portions, each of which extends in a linear direction parallel to an associated edge of the central area portion and to each other and an intermediate connecting portion wherein the intermediate corrugated member and the two planar sheet-like panel members remain in the separated relationship.

Another feature of the invention is that the flat body portion has top and bottom generally planar surfaces and at least a portion of the integral hinge portion is located below the generally planar bottom surface so that when an unloaded plastic slip pallet is supported on a generally planar support surface, there exists a space between a major portion of the bottom surface and the support surface so that when the boxes are loaded onto the flat body portion, the major portion of the bottom surface will be moved into contact with the support surface and rotate the lip means around the hinge portion to decrease the included angle between the lip means and the flat body portion and increase the angle between the lip means and the support surface so that the lip means may e readily gripped by a conventional lift truck.

The apparatus for processing unformed pieces of corrugated material having generally planar upper and lower surfaces into formed corrugated plastic slip pallets having a flat body portion for supporting cartons thereon and at least three lip portions hingedly connected to three edges of the flat body portion and each of the lip portions having an included angle with the flat body portion of less than 180 degrees comprises a first section having spaced apart, movable conveyor means located so that a wooden pallet having a plurality of unformed pieces of corrugated material supported thereon may be positioned on the spaced apart, movable conveyor means at a first location for movement therewith. A support table having a generally planar upper surface is located between the spaced apart, movable conveyor means at a second location spaced from the first location and the planar surface of the support table lies in a plane located below a plane extending between the spaced apart, movable conveyor means. Moving means are provided for moving the spaced apart movable conveyor means so that the wooden pallet with the plurality of unformed pieces of corrugated material thereon is moved from the first location to the second location. Lifting means are provided for moving the support table into contact with the wooden pallet to move the wooden pallet with the plurality of unformed pieces of corrugated material upwardly in a vertical direction so that each of the plurality of pieces of corrugated material may be removed and downwardly in a vertical direction until the support table is below the conveyor means so that the wooden pallet can be removed and a new wooden pallet with a new plurality of pieces of corrugated material can be positioned on the support table. A second section of the apparatus comprises a vacuum transfer means and a vacuum conveyor belt means wherein the vacuum transfer means contacts the upper one of the plurality of pieces of unformed corrugated material and transfers it to the vacuum conveyor belt means for movement therewith from the second section into a third section of the apparatus. The third section has apparatus for forming the unformed pieces of corrugated material into a corrugated plastic slip pallet having a flat body portion for supporting cartons thereon and at least three lip portions hingedly connected to three edges of the flat body portion and each of the lip portions having an included angle with said flat body portion of less than 180 degrees. Transfer means are provided in a fourth section of the apparatus for contacting the corrugated plastic slip pallet in the third section and transferring it to a fifth section of the apparatus. Receiving means are provided in the fifth section for supporting a wooden pallet thereon for receiving the corrugated plastic slip pallet from the transfer means. Moving means are provided for moving the receiving means upwardly in a vertical direction to a location for receiving corrugated plastic slip pallets and for indexing the receiving means downwardly in a vertical direction so that additional corrugated plastic slip pallets may be deposited thereon. The fifth section has conveyor means located so that the wooden pallet on the receiving means, when the receiving means has been moved into its lowest downward position will be below the conveyor means so that the wooden pallet with a plurality of the corrugated plastic slip pallets will be supported on the conveyor means. Moving means are provided for moving the conveyor means so that the wooden pallet with the plurality of corrugated plastic slip pallets thereon may be moved to a location whereat it can be removed from the conveyor means.

BRIEF DESCRIPTION OF THE DRAWINGS

An illustrative and presently preferred embodiment of the invention is shown in the accompanying drawings in which.

DETAILED DESCRIPTION OF THE INVENTION

Figures 1, 1A, 1B:
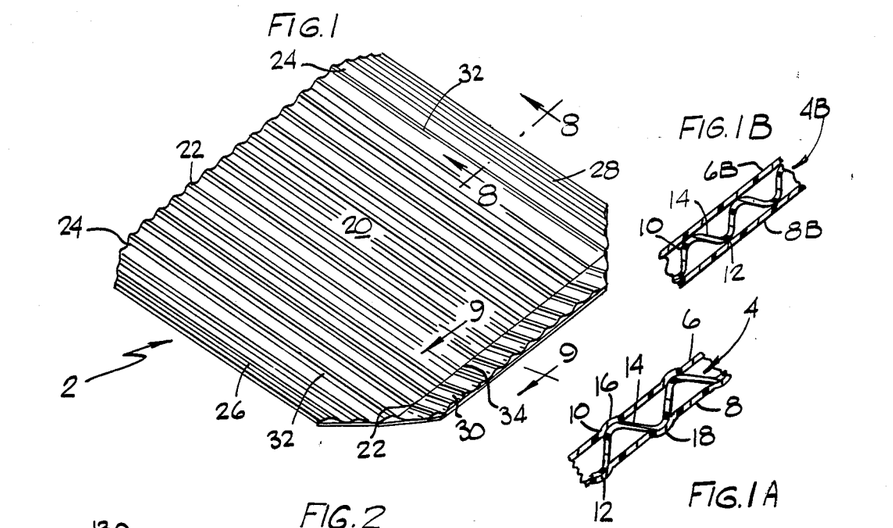
FIG. 1 is a perspective view of a corrugated plastic slip pallet made in accordance with this invention.
FIG. 1A is an enlarged view of a portion of FIG. 1.
FIG. 1B is an enlarged view of a modification of FIG. 1.
Figure 3:
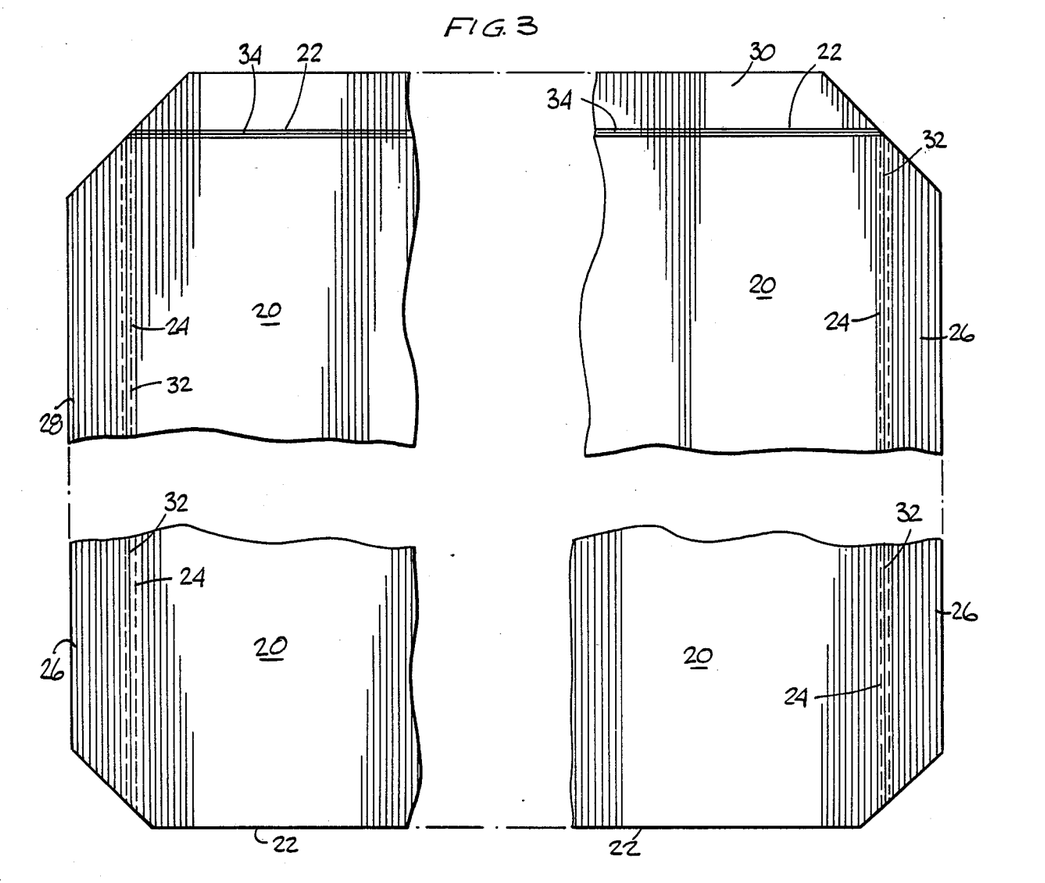
FIG. 3 is a top plan view of the corrugated slip pallet.

In FIG. 1, there is a perspective illustration of a corrugated plastic slip pallet 2 and in FIG. 3 a top plan view thereof comprising an intermediate corrugated member 4 sandwiched between a generally planar sheet-like top panel member 6 and a generally planar sheet-like bottom panel member 8. In the manufacturing operation of the corrugated plastic slip pallet 2 of FIGS. 1 and 1A, the areas between the crests 10 and valleys 12 of the corrugations 14 are pressed inwardly to form ridges 16 and 18. An extruded corrugated plastic slip pallet 2 is illustrated in FIG. 1B and has an intermediate corrugated member 4B sandwiched between a generally planar sheet-like top panel member 6B and a generally planar sheet-like bottom panel member 8B. Therefore, the term generally planar sheet-like top or bottom panel member will include the constructions of FIGS. 1A and 1B or other similar constructions. It is also understood that the intermediate corrugated member 4 may be of configurations other than the wave-like shape in the drawings having portions thereof secured to the top panel member 6 and other portions thereof secured to the bottom panel member 8. The corrugated plastic slip pallet 2 has a generally rectangular flat body portion 20 having opposite pairs of parallel edges 22 and 24. Lip portions 26, 28, 30 are located alongside each of the edges 24 and alongside one of the edges 22 and extend upwardly in relation to the flat body portion 20 so that the included angle therebetween is less than 180 degrees. The lip portions are connected by integral hinge means 32 and 34, illustrated specifically in FIGS. 13 and 14, with the hinge means 32 extending in a direction generally parallel with the corrugations 14 and the hinge means 34 extending in a direction generally perpendicular to the corrugations 14.

Figure 2:
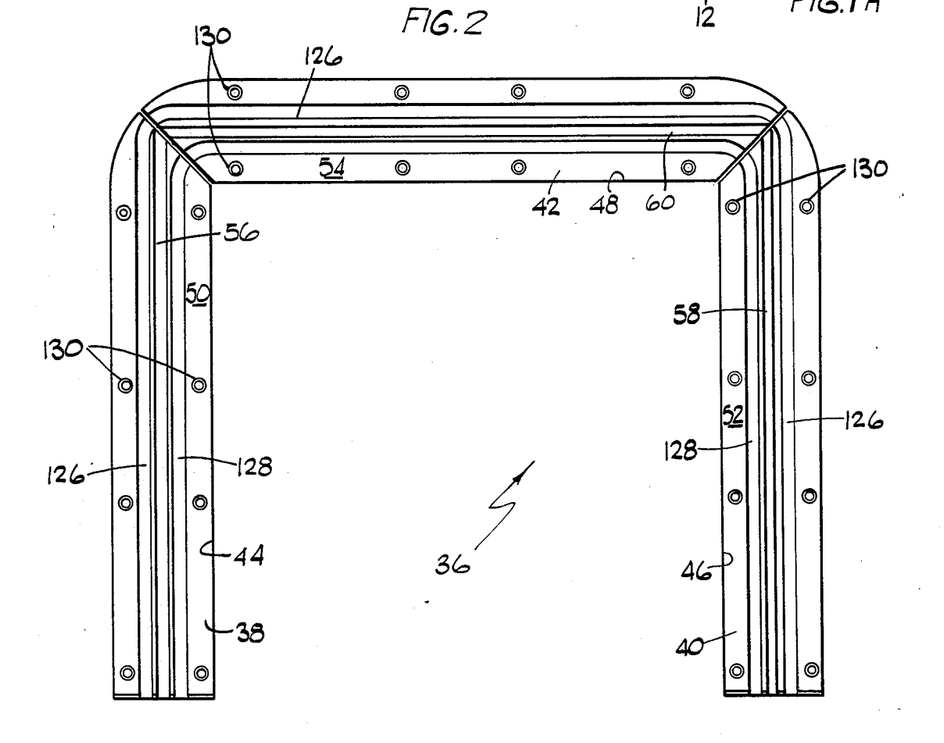
FIG. 2 is a top plan view of the anvil means of this invention.
Figure 8:
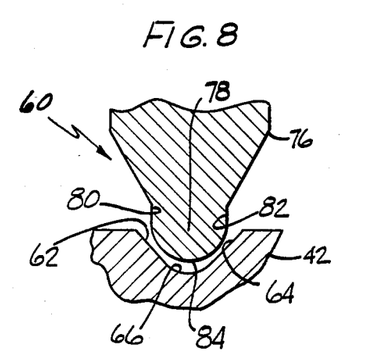
FIG. 8 is an enlarged view of a portion of FIG. 7 and a portion of a horn tip.
Figure 9:
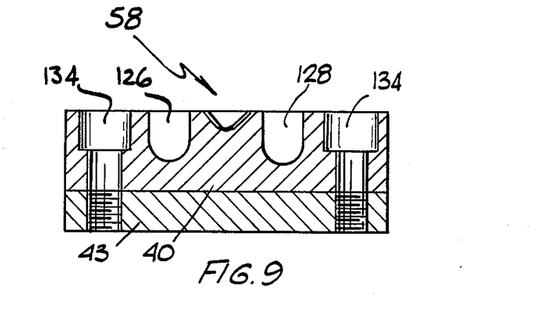
FIG. 9 is a cross-sectional view taken on the line 9—9 of FIG. 6.

The apparatus for forming the integral hinge means 32 and 34 is schematically illustrated in FIGS. 2-9. In FIG. 2, there is a top plan view of the generally U-shaped anvil means 36 comprising a left section 38, a right section 40 and a center section 42 secured to a base member support 43 comprising four members in a picture-frame relationship. The sections 38, 40 and 42, respectively, have inner linear edges 44, 46 and 48 with the inner linear edges 44 and 46 being parallel to each other and the inner linear edge 48 being perpendicular to the inner linear edges 44 and 46. Each of the sections 38, 40 and 42 has a generally planar upper surface 50, 52 and 54 and a linearly extending V-shaped groove 56, 58 and 60 extending downwardly from the generally planar upper surfaces 50, 52 and 54. As illustrated in FIG. 8, the V-shaped groove 60 has oppositely facing linearly extending side wall portions 62 and 64 so as to have an included angle of 90 degrees therebetween. An arcuate section 66 connects the ends of the side wall portions 62 and 64. The V-shaped grooves 56 and 58 are of the same construction, with groove 58 being illustrated in FIG. 10, and each has a plurality of spaced apart abutments 68 having oppositely facing linearly extending side wall portions 70 and 72 so as to have an included angle of 90 degrees. An arcuate section 74 connects the ends of the side wall portions 70 and 72. The abutments 68 in the grooves 56 and 58 are formed by a milling operation and are constructed so that the distances between the oppositely facing linearly extending wall portions 70 and 72 are the same as the distance between the oppositely facing linearly extending wall portions 62 and 64.

Figure 4:
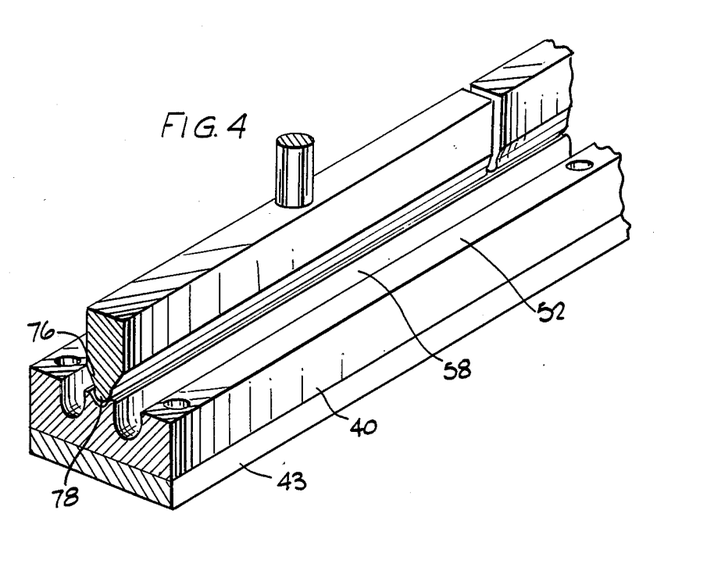
FIG. 4 is a perspective view of a portion of the anvil means and portions of two ultrasonic welding horns.
Figures 5, 7:
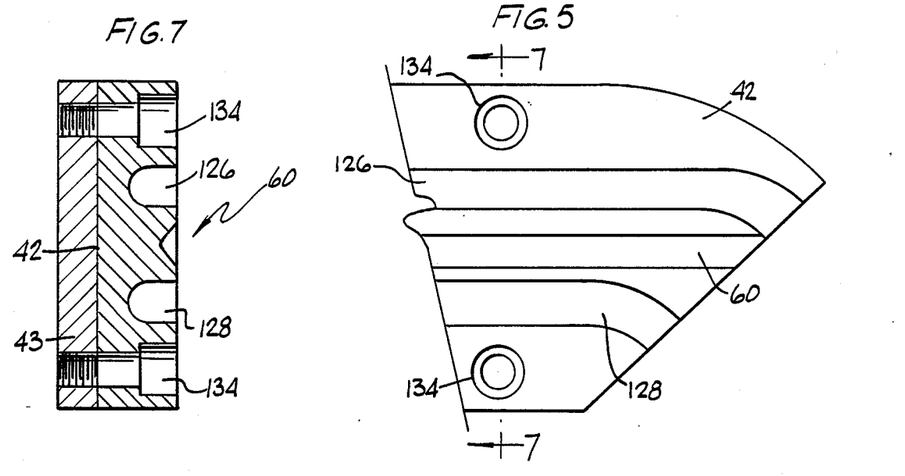
FIG. 5 is an enlarged view of a portion of one section of the anvil means of FIG. 2.
FIG. 7 is a cross-sectional view taken on the line 7—7 of FIG. 5.
Figure 6:
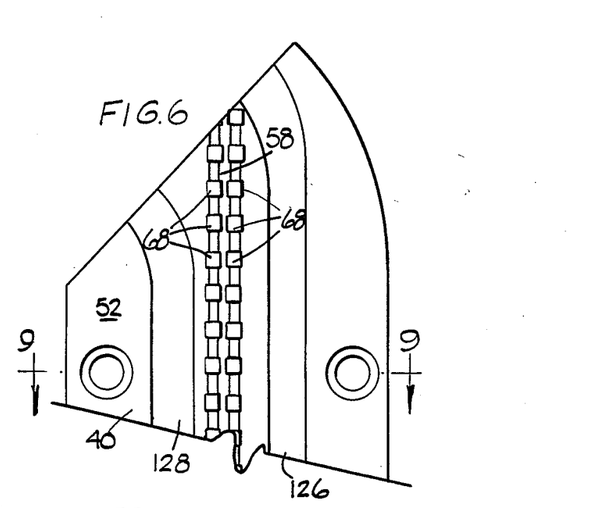
FIG. 6 is an enlarged view of a portion of another section of the anvil means of FIG. 2.
Figure 10:
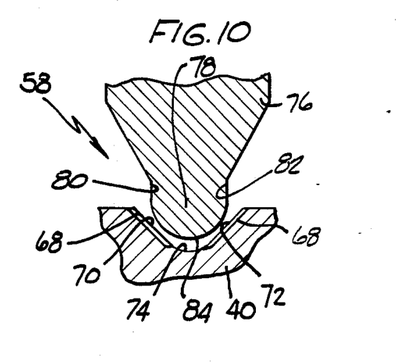
FIG. 10 is an enlarged view of a portion of FIG. 9 and a portion of a horn tip.

In FIGS. 4, 8 and 10, a horn portion 76 of an ultrasonic welding apparatus, described more fully below, has a tip portion 78 opposite generally planar side walls 80 and 82 and an arcuate wall 84 extending between the side walls 8 and 82. The arcuate wall 84 is semi-circular and has a radius greater than the radius of the arcuate sections 66 and 74 of the V-shaped grooves 58 and 60.

Figure 11:
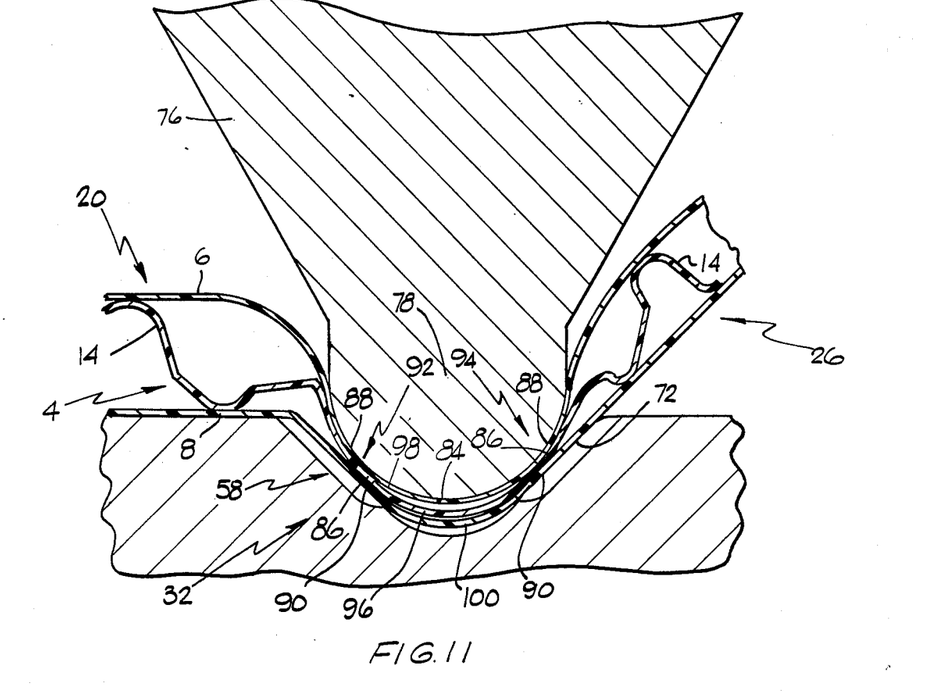
FIG. 11 is an enlarged cross-sectional view showing the location of the various parts during the forming of the two spaced apart welded portions extending parallel to the corrugations.

The formation of the integral hinge 32 connecting the lip portions 26 and 28 to the flat body portion 20 is illustrated in FIG. 11. The horn portion 76 is moved downwardly so that the arcuate wall 84 of the tip portion 78 moves into contact with the top panel member 6 and the downward movement of the horn portion 76 is continued so as to deform superposed portions of the top panel member 6, the intermediate corrugated member 4 and the bottom panel member 8 into the groove 58. The downward movement of the horn portion 76 is continued until a portion 86 of the intermediate corrugated member 4 is in contact with the superposed portions 88 and 90 of the top panel member 6 and the bottom panel member 8 at the spaced apart locations 92 and 94. This relationship exists only between the wall portions 70 and 72 of the spaced apart abutments 68 and the opposite portions of the arcuate wall 84. The portions 96, 98 and 100 of the intermediate corrugated member 4, the top panel member 6 and the bottom panel member 8 between the spaced apart locations 92 and 94 remain separated. The ultrasonic welding apparatus is then actuated so that the superposed portions 86, 88 and 90 of the intermediate corrugated member 4, the top panel member 6 and the bottom panel member 8 at the spaced apart locations 92 and 94 are welded together. The portions 96, 98 and 100 cooperate with the welded together superposed portions 86, 88 and 90 to form hinge means holding the lip portion 26 to the flat body portion 20 at an included angle of between about 135 and 160 degrees and preferably of about 150 degrees. The lip portion 28 is connected to the flat body portion 20 in the same manner. The welded together superposed portions 86, 88 and 90 comprise a plurality of spaced apart welded areas and extend in linear directions generally parallel to the edge 24 and parallel to each other.

The formation of the integral hinge 34 connecting the lip portion 30 to the flat body portion 2 is illustrated in FIG. 10. The horn portion 76 is moved downwardly so that the arcuate wall 84 moves into contact with the top panel member 6 and the downward movement of the horn portion 76 is continued so as to deform superposed portions of the top panel member 6, the intermediate corrugated member 4 and the bottom panel member 8 into the groove 60. The downward movement of the horn portion is continued until a portion 110 of the intermediate corrugated member 4 is in contact with the superposed portions 112 and 114 of the top panel member 6 and the bottom panel member 8 at the spaced apart locations 116 and 118. The portions 120, 122 and 124 of the intermediate corrugated member 4, the top panel member 6 and the bottom panel member 8 between the spaced apart locations 116 and 118 remain separated. The ultrasonic welding apparatus is then actuated so that the superposed portions 110, 112 and 114 of the intermediate corrugated member 4, the top panel member 6 and the bottom panel member 8 at the spaced apart locations 116 and 118 are welded together. The linearly extending side wall portions 62 and 64 are continuous so that the welded together superposed portions 110, 112 and 114 at the spaced apart locations 116 and 118 are continuous. The portions 120, 122 and 124 cooperate with the welded together superposed portions 110, 112 and 114 to form hinge means holding the lip portion 30 to the flat body portion 20 at an included angle of between about 135 and 160 degrees and preferably of about.150 degrees. Each of the sections 38, 40 and 42 of the anvil means 36 have spaced apart U-shaped recesses 126 and 128 for receiving a cooling tube, described below. Also, each of the sections 38, 40 and 42 are provided with a plurality of flanged bores 130 so that each of the sections 38, 40 and 42 may be secured to the base member means 43 by threaded bolts (not shown).

Figure 13:
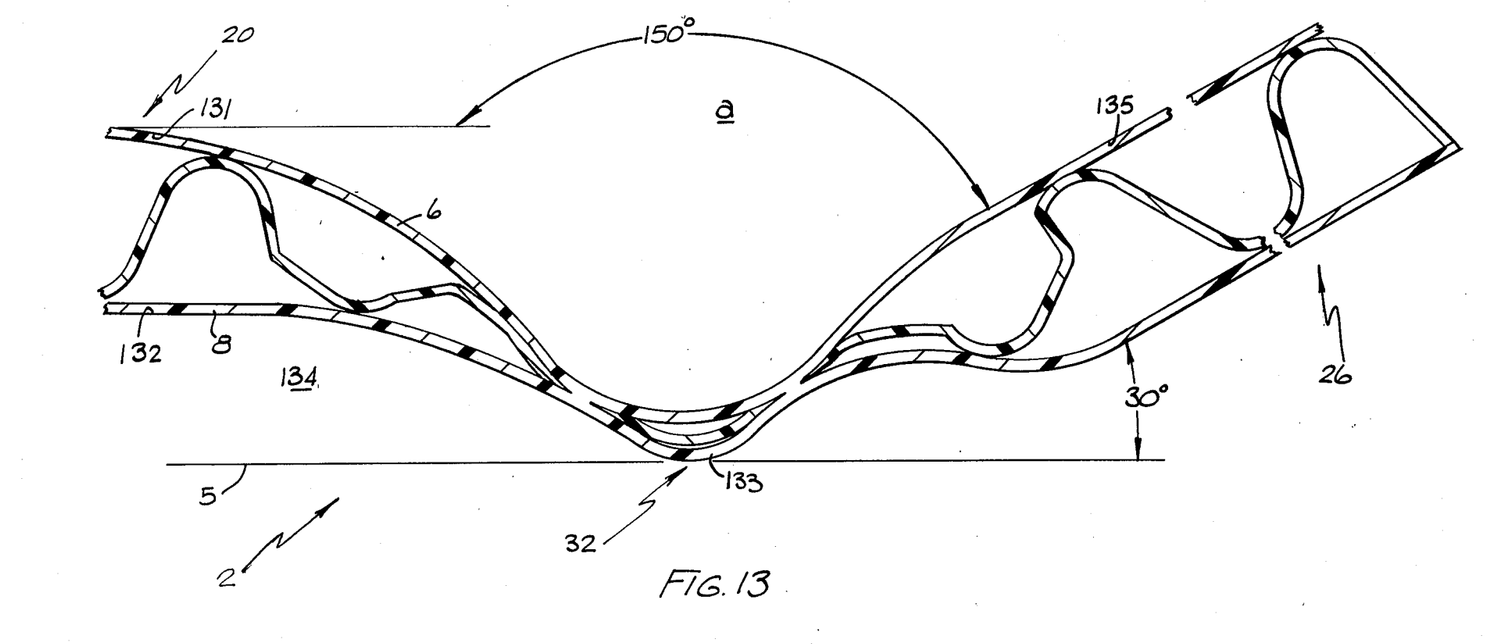
FIG. 13 illustrates a portion of an unloaded corrugated slip pallet.
Figure 14:
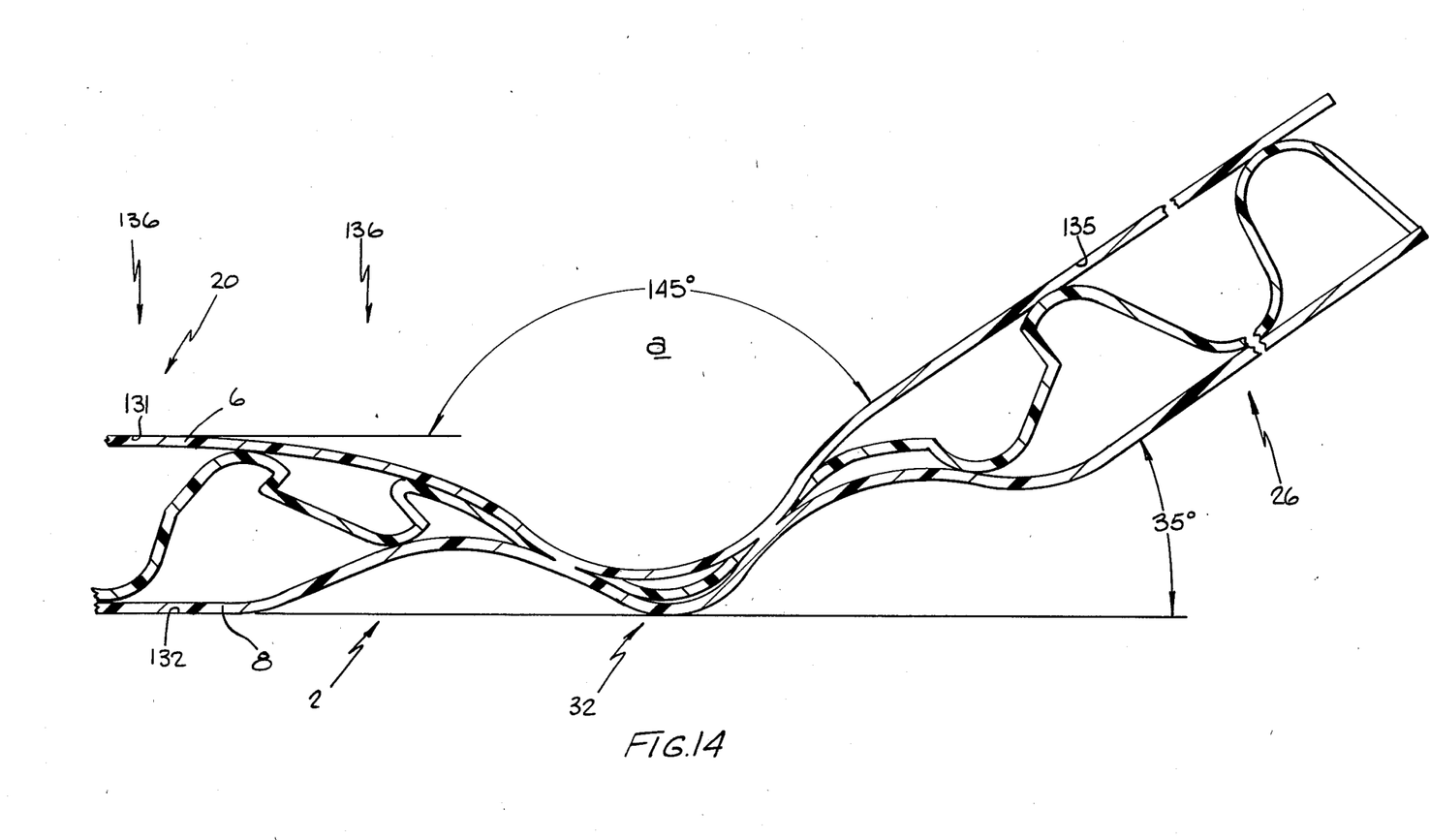
FIG. 14 illustrates a portion of a loaded corrugated slip pallet.

The relationship of an unloaded corrugated slip pallet 2 and a loaded corrugated slip pallet is illustrated in FIGS. 13 and 14. In FIG. 13, there is illustrated an unloaded corrugated slip pallet 2 with the hinge means 32 formed as in FIG. 11. The top panel member 6 of the flat body portion 20 has a generally planar top surface 131 and the bottom panel member 8 has a generally planar bottom surface 132. The hinge means 32 has at least a portion 133 thereof located below the generally planar bottom surface 132 so that a space 134 exists between a major portion of the generally planar bottom surface 132 and the generally planar support surface S when the corrugated slip pallet 2 is supported on the support surface S. An included angle a is formed between the generally planar top surface 131 of the flat body portion 20 and the planar top surface 135 of the lip means 26. When a load of boxes, indicated by the arrows 136 in FIG. 14, is placed on the planar top surface 131, the weight thereof moves the bottom surface 132 into contact with the support surface S which causes a rotation of the lip means 26 around the hinge means 32 so as to decrease the included angle a so that the lip means 26 is at a greater angle relative to the support surface S so that it may be readily gripped by a properly equipped lift truck.

The apparatus for processing pieces of unformed corrugated plastic material into formed corrugated plastic slip pallets is illustrated in FIGS. 15-19. A first section 140 of the apparatus has a pair of spaced apart movable conveyor means 142 and 144, each of which comprises an endless chain 146 journaled around sprockets 148 on shafts 150 and driven by the motor 152. The movable conveyor means 142 and 144 are spaced a distance apart so that a wooden pallet 154 having a plurality of pieces of unformed corrugated plastic material 156 may be supported on the conveyor means 142 and 144 for movement therewith. As illustrated in dotted outline in FIG. 16, each of the pieces of unformed corrugated plastic material 156 has a flat body portion 158, a leading edge portion 160, a trailing edge portion 162 and two opposite side edge portions 164 and 166. The wooden pallet 154 having the plurality of pieces of unformed corrugated plastic material 156 thereon is placed on the spaced apart conveyor means 142 and 144 by suitable means, such as a fork lift truck (not shown) at a first location 168. A support table 170 having a generally planar surface 172 is located between the spaced apart conveyor means 142 and 144 at a second location 174. Lifting means 176 are provided for moving the support table 170 upwardly and downwardly in vertical directions. In its lowermost position, the generally planar surface 172 of the support table 170 lies in a plane below a plane extending between the upper portion of the spaced apart conveyor means 142 and 144 so that the wooden pallet 154 may be moved by the spaced apart conveyor means 142 and 144 to a location over the support table 170 so that the generally planar surface 172 may be moved upwardly into contact therewith. The support table 170 is moved upwardly in increments by conventional means (not shown) so that pieces of unformed corrugated plastic material 156 may be removed therefrom in a second section 177 of the apparatus.

Figure 15:
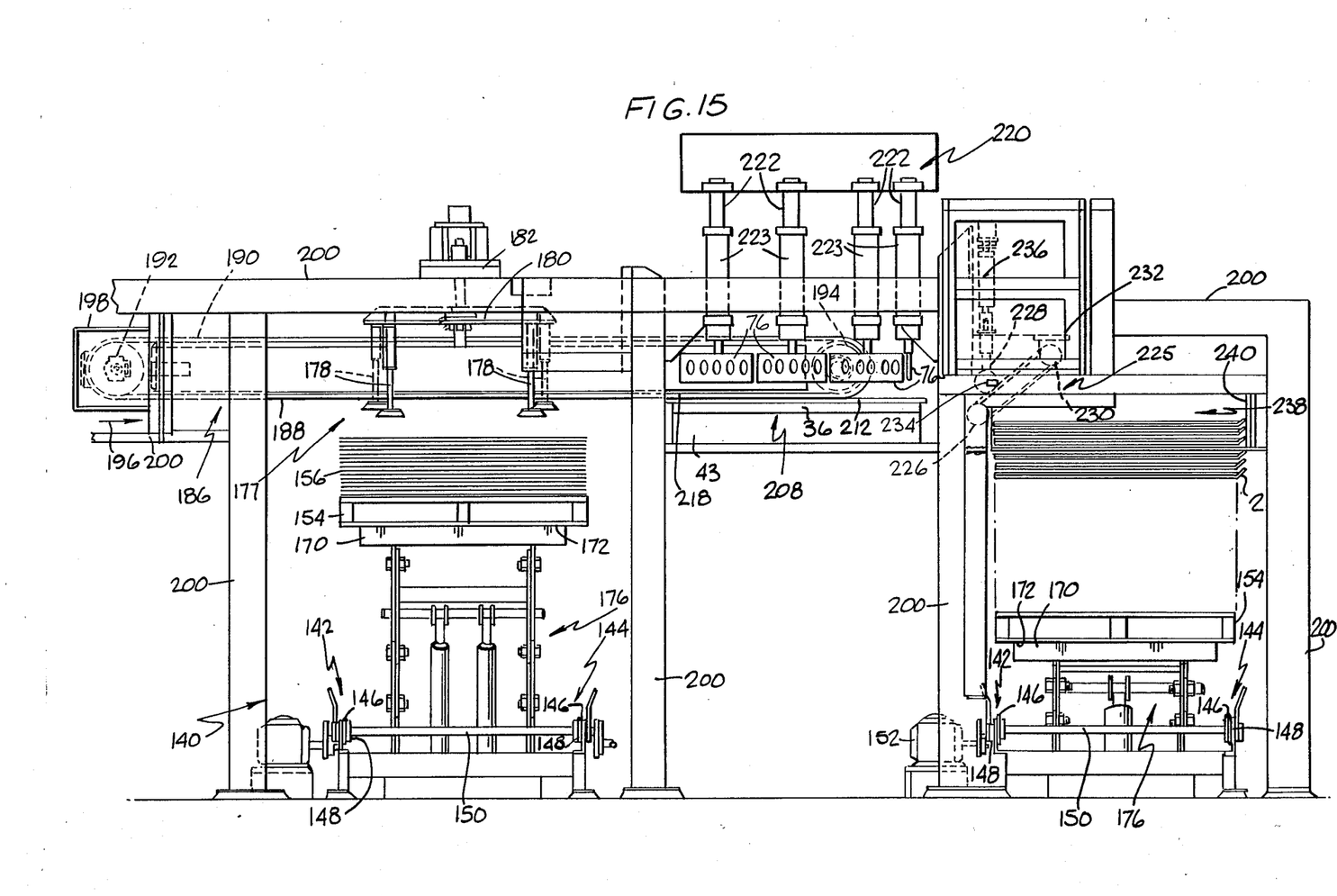
FIG. 15 is a side elevational view of apparatus for use in forming corrugated plastic slip pallets.
Figure 16:
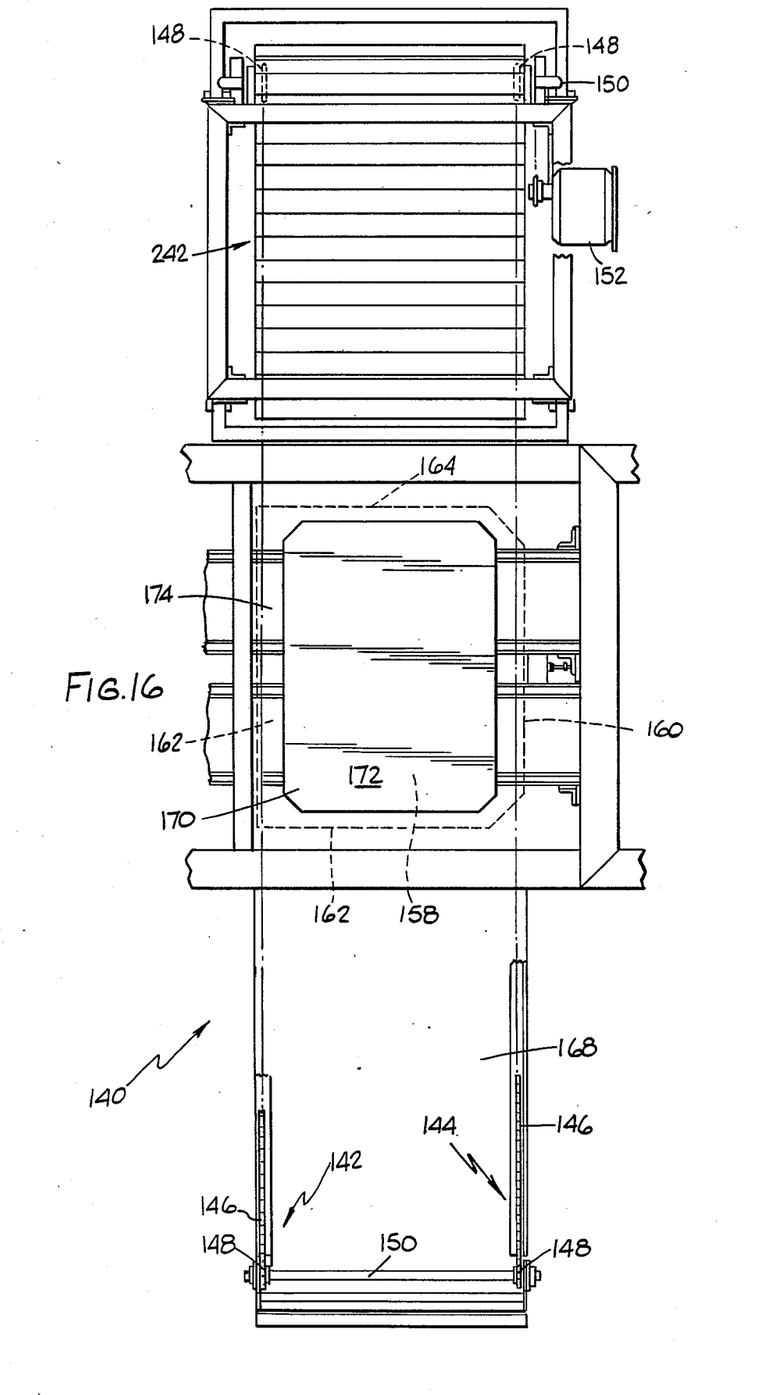
FIG. 16 is a top plan view of a portion of the apparatus of FIG. 15.

The second section 177 for removing the top one of the plurality of pieces of unformed corrugated plastic material 156 is illustrated in FIG. 15 and comprises a plurality of vacuum cup transfer means 178 which are mounted in a frame 180 which is moved upwardly and downwardly in a vertical direction by the driving means 182. At their lowest position, the vacuum cup means 178 contact the top one of the plurality of pieces of unformed corrugated plastic material 156 and lift it upwardly. A vacuum conveyor means 186 has a lower run 188 and an upper run 190 and moves around spaced apart roller means 192 and 194. As the vacuum cup means 178 move upwardly, the top one of the plurality of pieces of unformed corrugated plastic material 156 carried thereby is transferred to the lower run 188 which moves in the direction indicated by the arrow 196 and is driven by the motor 198. Conventional support means 200 are used to support various parts of the apparatus.

Figure 12:
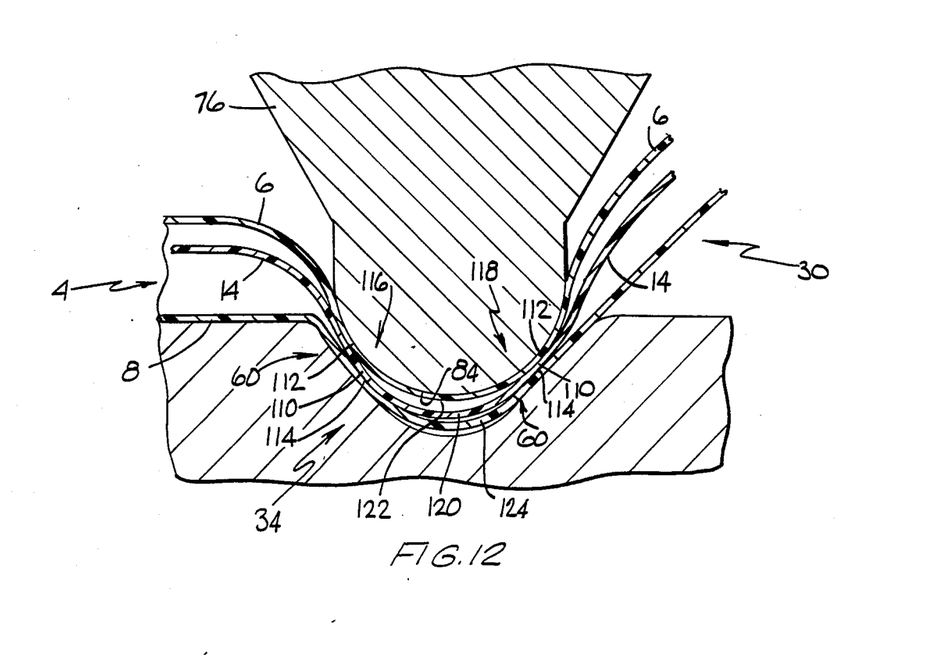
FIG. 12 is an enlarged cross-sectional view showing the location of the various parts during the formation of the two spaced apart welded portions extending perpendicular to the corrugations.
Figure 17:
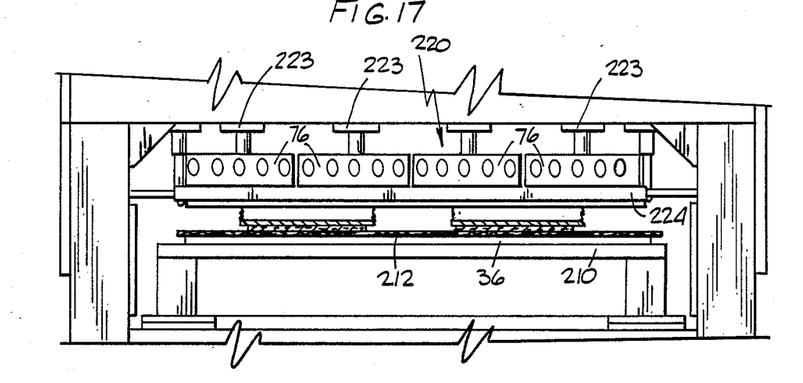
FIG. 17 is an end elevational view of a portion of the apparatus of FIG. 16.
Figure 18:
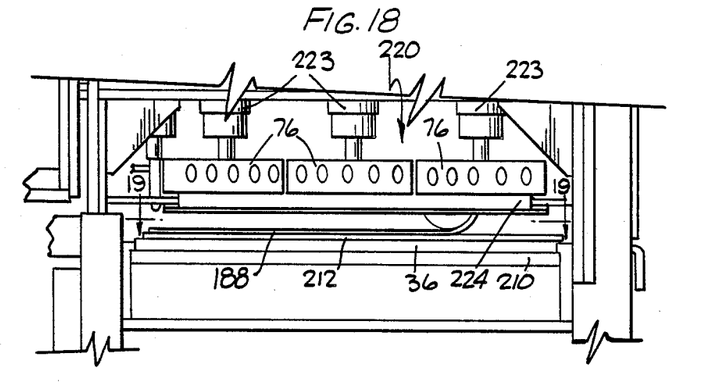
FIG. 18 is a side elevational view of a portion of the apparatus of FIG. 16.
Figure 19:
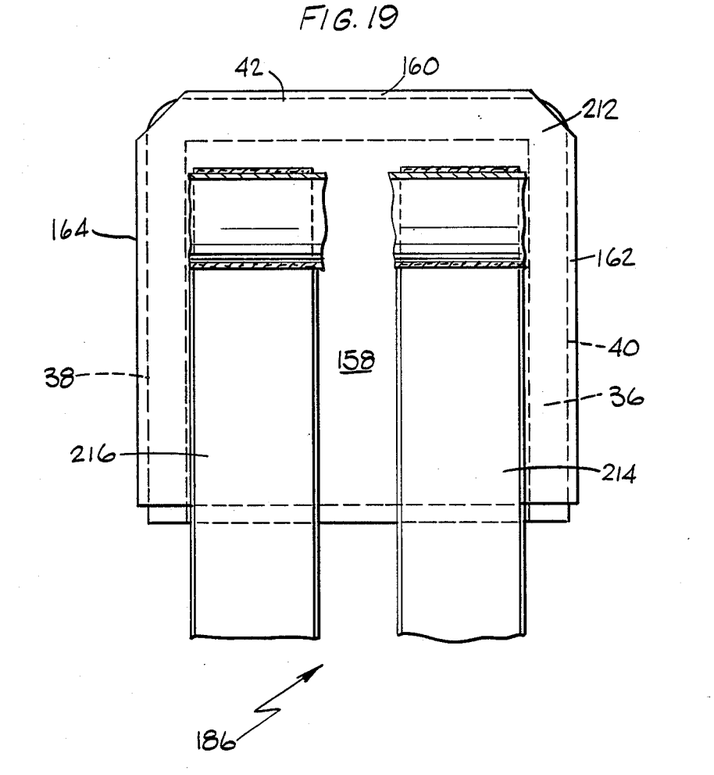
FIG. 19 is a cross-sectional view of a portion of the apparatus taken on the line 19—19 of FIG. 18.

The lower run 188 carries the top one of the plurality of pieces of unformed corrugated plastic material 156 from the second section 177 of the apparatus into a third section 208 of the apparatus wherein the top one is formed into a corrugated plastic slip pallet 2. The third section 208 comprises a base member support 43 on which the anvil means 36 are mounted by bolts passing through the bore means 134 and threadedly engaged (not shown) in the base member support 43. An unformed corrugated plastic board-like member 212 is positioned over the anvil means 36, FIG. 15, so that the leading edge portion 160 and the side edge portions 162 and 164 project outwardly from the corresponding portions of the anvil means 36 for a distance of about one inch. As illustrated in FIG. 17 and 19, the vacuum conveyor means 186 comprises two spaced apart endless vacuum belts 214 and 216 with the lower runs 188 thereof passing beneath a vacuum producing housing 218. An ultrasonic welding apparatus 220 including power means has a plurality of horn portions 76 arranged for cooperation with the V-shaped grooves 56, 58 and 60 in the anvil means 36. Each of the horn portions 76 is movable upwardly and downwardly in vertical direction by being connected to pistons 222 moving through cylinders 223. As illustrated in FIGS. 18 and 19, the spaced apart endless vacuum belts 214 and 216 end before the center section 42 of the anvil means 36 so that when the unformed piece of corrugated plastic material 212 is in position over the anvil means 36, it is held in such position by the vacuum belts 214 and 216 acting on a major portion of the flat body portion 158 thereof. As the horn portions 76 move downwardly into contact with the unformed piece of corrugated plastic material 212, they function in the manner described above in relation to FIGS. 11 and 12 to form the unformed piece of corrugated plastic material 212 into a corrugated plastic slip pallet 2. An air knife 224 (not shown in FIG. 15) is used to cool and separate the hinge means 32 and 34 from the horn portions 76.

After the corrugated plastic slip pallet 2 has been formed, the vacuum belts 214 and 216 are put into motion to move the corrugated plastic slip pallet 2 out of the third section 208 and into a fourth section 225. In the fourth section 225, there are a pair of opposed gripping rollers 226 and 228. The gripping roller 226 is mounted at a fixed location and is rotated by a moving belt 230 driven by the motor 232. The gripping roller 228 is mounted for movement upwardly and downwardly in a vertical direction, in response to a signal from a sensor 234, by movement producing means 236. As the leading edge 160 is sensed by the sensor 234, the gripping roller 228 is moved downwardly until the corrugated plastic slip pallet 2 is gripped between the gripping rollers 226 and 228. The rotation of the gripping roller 226 functions to move the corrugated plastic slip pallet 2 out of the third section 208, through the fourth section 225 and into a fifth section 238.

The apparatus in the fifth section 238 is substantially the same as the apparatus in the first section 140 and the same reference numerals will be used to identify the corresponding parts. A pair of spaced apart movable conveyor means 142 and 144, each of which comprises an endless chain 146, journaled around sprockets 148 on shafts 150, are driven by the motor 152. The movable conveyor means 142 and 144 are spaced a distance apart so that a wooden pallet 154 having a plurality of corrugated plastic slip pallets 2 thereon may be supported on the movable conveyor means 142 and 144 for movement therewith. A support table 170 having a generally planar surface 172 is located between the spaced apart conveyor means 142 and 144 and is located generally in the middle of the fifth section 238. Lifting means 176 are provided for moving the support table 170 upwardly and downwardly in vertical directions. In its lowermost position, the generally planar surface 172 lies in a plane below a plane extending between the upper portion of the spaced apart conveyor means 142 and 144 so that, when the support table 170 is in its lowermost position, the wooden pallet 154 will be supported on the conveyor means 142 and 144 for movement therewith. At its uppermost position, the support table 170 positions the wooden pallet 154 inside a frame member 240 which receives the corrugated plastic slip pallet 2 from the gripping rollers 226 and 228 and guides it into a proper position on the wooden pallet 154. The support table 170 is moved downwardly in increments, by conventional means (not shown), as additional corrugated plastic slip pallets 2 are placed in a position to be supported on the wooden pallet 154. When the support table 170 has moved to its lowermost position, the conveyor means 142 and 144 are actuated and move the wooden pallet 154 with the plurality of corrugated plastic slip pallets 2 supported thereon to a location where the wooden pallet 154 can be positioned on a transporting device, such as a fork lift truck, and moved into storage.

The first section 140 is provided with a wooden pallet storage apparatus 242 whereby a wooden pallet 154 may be moved by the conveyor means 142 and 144 from a location over the support table 170 into the wooden pallet storage apparatus 242. Similar apparatus is provided for the fifth section 238, whereby wooden pallets are moved out of a wooden pallet storage apparatus by the conveyor means 142 and 144 and positioned over the support table 170 s that the wooden pallet 154 can be moved to the uppermost position to begin receiving corrugated plastic slip pallets 2.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A piece of laminated corrugated material having a pair of flat panel members fixedly connected to crest and valley portions of an intermediate corrugated member and comprising:

at least one flat body portion of the corrugated material connected to at least one other portion of the corrugated material by an elongated integral hinge portion;

said integral hinge portion comprising an elongated groove having inclined side wall portions located on opposite sides of and being integrally connected to an intermediate connecting portion;

each of said side wall portions including an relatively narrow width weld portion whereat the flat panel members and the intermediate corrugated member are fixedly permanently connected and located in abutting relationship on opposite sides of said intermediate connecting portion;

said panel members and said intermediate corrugated member being spaced from and unconnected with one another except for said connection at said crest and valley portions along said intermediate connecting portion; and the thickness of said intermediate connecting portion being greater than the combined individual thickness of said panel members and the thickness at each weld portion being approximately equal to or less than the combined individual thickness of the panel members and the intermediate corrugated member.

2. A corrugated plastic board-like member comprising:

a corrugated board-like member formed from a plastic material and having at least three layers comprising an intermediate corrugated member having crests and valleys sandwiched between two generally planar sheet-like panel members where one of said generally planar sheet-like panel members is secured to said intermediate corrugated member at said crests and the other of said generally planar sheet-like panel members is secured to said intermediate corrugated member at said valleys so that said two generally planar sheet-like panel members and said intermediate corrugated member are spaced apart from each other except at said crests or valleys;

said corrugated plastic board-like member having a flat body portion;

said flat body portion defined by opposite pairs of parallel edges;

an integral lip portion extending outwardly from at least one of said edges and extending upwardly therefrom at an included angle to said flat body portion of less than 180 degrees;

integral hinge means for connecting said lip portion to said flat body portion along said at least one of said edges; and said integral hinge means comprising at least two spaced apart welded portions welding together superposed and abutting portions of said intermediate corrugated member and said two generally planar sheet-like panel members, said two spaced apart welded portion extending in directions parallel to said at least one of said edges and to each other so that the portions of said two generally planar sheet-like panel members and said intermediate corrugated member located between said two spaced apart welded portions remain separated from each other except for the location therein of any crest or valley.

3. The invention as defined in claim 2 wherein:
each of said welded portions is substantially continuous.

4. The invention as defined in claim 2 and further comprising:

at least two additional lip portions alongside at least two more of said edges;

integral hinge means for connecting said at least two additional lip portions to one of said two more of said edges and the other of said at least two more additional lip portions to the other of said two more of said edges; and said integral hinge means comprising at least two spaced apart welded portions joining together at least portions of said intermediate corrugated member and said two generally planar sheet-like panel members and extending in directions parallel to an associated edge and to each others so that the portions of said two generally planar sheet-like panel members and said intermediate corrugated member located between said two spaced apart welded portions remain separated from each other except for the location therein of any crest or valley.

5. The invention as defined in claim 4 wherein:
each of said welded portions between said at least two additional lip means and said at least two more of said edges comprises a plurality of spaced apart welded 6. The invention as defined in claim 5 wherein:
said flat body portion having one free edge having no lip means; and the corrugations in said intermediate corrugated member extend in directions perpendicular to said one free edge.

7. The invention as defined in claim 5 wherein:
said flat body portion has top surface;
each of said lip portion has a top surface; and the included angle between said top surface of each of said lip portion and said top surface of said flat body portion is between about 135 and 16 degrees.

8. A plastic slip pallet for holding a load of boxes, or the like comprising:

a slip pallet formed from a plastic material;

said plastic slip pallet having a flat body portion on which said boxes are supported;

said flat body portion defined by opposite pairs of parallel edges to provide a peripheral configuration generally corresponding to the peripheral configuration formed by said boxes;

said flat body portion having generally planar top and bottom surfaces;

at least one integral lip portion having generally planar top and bottom surfaces located alongside at least one of said edges and extending upwardly therefrom so that between said top surface of said lip portion and said top surface of said flat body portion there is an included angle less than 180 degrees;

integral hinge means for connecting said lip portion to said flat body portion along said at least one of said edges;

at least a portion of said integral hinge means being located below said generally planar bottom surface of said flat body portion so that when an unloaded plastic slip pallet is supported on a generally planar support surface, there exists a space between at least a major portion of said generally planar bottom surface of said flat body portion and said generally planar support surface so that when said boxes are loaded onto said flat body portion, said major portion of said generally planar bottom surface thereof will be moved into contact with said generally planar support surface and move said lip portion to decrease said included angle between said top surface of said lip portion and said top surface of said flat body portion.

9. The invention as defined in claim 8 wherein said plastic slip pallet comprises:

a corrugated slip pallet formed from a plastic material and having at least three layers comprising an intermediate corrugated member having crests and valleys sandwiched between two generally planar sheetlike panel members where one of said generally planar sheet-like panel members is secured to said intermediate corrugated member at said crests and the other of said generally planar sheet-like panel members is secured to said intermediate corrugated member at said valleys so that said two generally planar sheet-like panel members and said intermediate corrugated member are spaced apart from each other except at said crests or valleys.

10. The invention as defined in claim 9 wherein said integral hinge means comprises:

at least two spaced apart welded portions welding together superposed portions of said intermediate corrugated member and said two generally planar sheet-like panel members said two spaced apart welded portions extending in directions parallel to said at least one of said edges and to each other so that the portions of said two generally planar sheet-like panel members and said intermediate corrugated member located between said two spaced apart welded portions remain separated from each other except for the location therein of any crest or valley.

11. The invention as defined in claim 10 and further comprising:

at least two additional lip portions alongside at least two more of said edges;

integral hinge means for connecting said at least two additional lip portions to one of said two more of said edges and the other of said at least two more additional lip portions to the other of said two more of said edges; and said integral hinge means comprising at least two spaced apart welded portions joining together at least portions of said intermediate corrugated member and said two generally planar sheet-like panel members and extending in directions parallel to an associated edge and to each other so that the portions of said two generally planar sheet-like panel members and said intermediate corrugated member located between said two spaced apart welded portions remain separated from each other except for the location therein of any crest or valley.

12. The invention as defined in claim 11 wherein:

said flat body portion has a top surface on which said boxes are supported;

each of said lip portions has a top surface; and the included angle between said top surface of each of said lip portions and said top surface of said flat body portion is between about 135 and 160 degrees.

* * * * *